A. BUGBEE.
Horse Hay-Rake.
No. 161,590. Patented April 6, 1875.
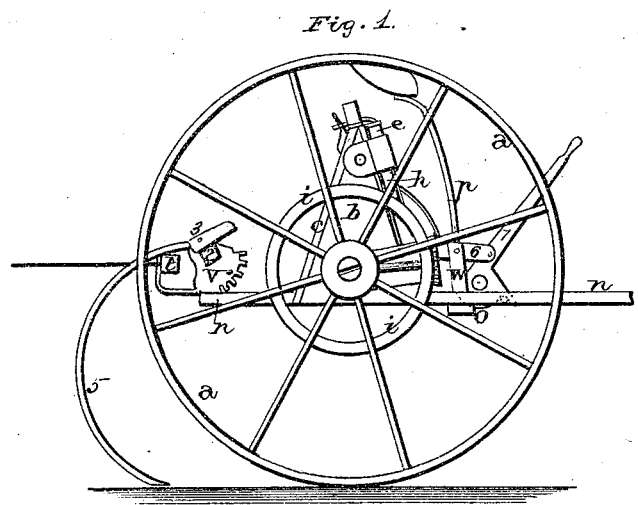
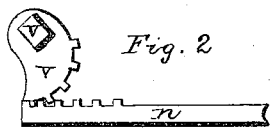
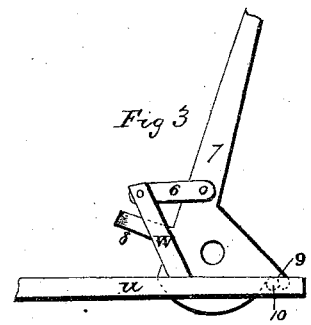
WITNESSES.
W<sup>m</sup> Garner,
C. W. Lemon
INVENTOR.
A. Bugbee
per
F. A. Lehmann,
atty.

UNITED STATES PATENT OFFICE.

ALPHEUS BUGBEE, OF ELKHART, INDIANA, ASSIGNOR TO SAML. A. HARRIS, OF MINNEAPOLIS, MINNESOTA.

IMPROVEMENT IN HORSE HAY-RAKES.

Specification forming part of Letters Patent No. 161,590, dated April 6, 1875; application filed January 19, 1875.

*To all whom it may concern:*

Be it known that I, ALPHEUS BUGBEE, of Elkhart, in the county of Elkhart and State of Indiana, have invented certain new and useful Improvements in Horse Hay-Rakes; and I do hereby declare the following to be a full, clear, and exact description of the invention, such as will enable others skilled in the art to which it pertains to make and use it, reference being had to the accompanying drawings, which form part of this specification.

My invention relates to an improvement in horse hay-rakes; and it consists in the arrangement and combination of parts that will be more fully described hereafter.

Figure 1 is a side elevation of my invention. Fig. 2 is a detached view of the toothed lever and cam for operating the rake. Fig. 3 is a side elevation of the lever for operating the rake. Figs. 4 and 5 are detached views of the rake-teeth.

Attached to the top of the box $b$, so that their ends will extend some distance behind it, are the shafts $n$, provided with the cross-piece $o$, in which the changeable seat $p$ is stuck. To the rear ends of the shafts, extending beyond the box, is pivoted the rake-head 2, to which head are secured the castings 3, to which the teeth 5 are pivoted. The front ends of these castings extend some distance beyond the front of the head, at which point the teeth are pivoted, and each casting has two ears or projections on its top, between which the teeth rest. Passing through these flanges are the wooden break-pins 4, which pass over the tops of the teeth, and prevent them from rising upward until they catch in some obstruction, when the pins break and allow the teeth to fly upward. Each one of the teeth is formed of thin sheet-steel, rolled into a concave form, so as to give it the proper rigidity and strength.

Teeth thus formed are very light, and can be made much cheaper than the usual round ones, while they possess all their advantages. Instead of making them concave, as shown, the teeth may also be made semicircular or half-round, their flat sides being turned preferably to the rear.

In the rear of the rake-head is placed the bar $t$, from which project the usual straight rods for cleaning the hay from the teeth as they are raised upward. Secured to the rake-head is the toothed cam $v$, which meshes with the rack formed on the rear end of the sliding lever $u$. To the front end of this lever is fastened a vertical arm, $w$, the upper end of which is pivoted to the connecting-rod 6, which rod connects it with the hand-lever 7. This lever 7 is pivoted near its lower end to a projection on the cross-piece $o$, and extends up in easy reach of the driver on his seat. The lower end of this lever forms a segment of a circle, and has an arm, 8, projecting out from it, upon which the driver places his foot, and thus can dump the rake without using his hands. In the front end of the segment is made a notch, 9, which catches over a pin, 10, on the front end of the sliding lever, and thus locks the teeth rigidly down, so that they cannot rise upward.

Having thus described my invention, I claim—

1. The combination of the rake-head 2, cam $v$, sliding lever $u$, arm $w$, rod 6, and lever 7, substantially as specified.

2. The lever 7, provided with the arm 8 and notch 9, in combination with the sliding lever $u$ and pin 10, substantially as shown and described.

In testimony that I claim the foregoing I have hereunto set my hand this 6th day of January, 1875.

ALPHEUS BUGBEE.

Witnesses:
GEO. M. COLBURN,
C. W. FISH.